United States Patent
Zim et al.

(10) Patent No.: US 9,222,019 B2
(45) Date of Patent: Dec. 29, 2015

(54) USE OF NIOBATE CONTAINING COMPOUNDS AS CORROSION INHIBITORS

(71) Applicant: Ecolab USA, Inc., Naperville, IL (US)

(72) Inventors: Danilo Zim, Campinas-SP (BR);
Matheus Paes Paschoalino, Campinas-SP (BR)

(73) Assignee: Ecolab USA Inc., St. Paul, MN (US)

( * ) Notice: Subject to any disclaimer, the term of this patent is extended or adjusted under 35 U.S.C. 154(b) by 71 days.

(21) Appl. No.: 14/065,968

(22) Filed: Oct. 29, 2013

(65) Prior Publication Data

US 2015/0118102 A1   Apr. 30, 2015

(51) Int. Cl.
| | |
|---|---|
| C23F 11/00 | (2006.01) |
| C23F 11/18 | (2006.01) |
| B08B 7/00 | (2006.01) |
| C09K 3/00 | (2006.01) |
| C09K 15/02 | (2006.01) |

(52) U.S. Cl.
CPC ...................................... C09K 15/02 (2013.01)

(58) Field of Classification Search
CPC ................ A61L 2/00; B08B 3/04; B08B 9/00
USPC ......... 422/7, 12–14, 16, 19, 292; 134/6, 22.1; 252/380
See application file for complete search history.

(56) References Cited

U.S. PATENT DOCUMENTS

| | | | |
|---|---|---|---|
| 4,600,558 A | 7/1986 | Novotny | |
| 4,692,316 A | 9/1987 | Greaves et al. | |
| 5,192,447 A | 3/1993 | Fivizzani | |
| 5,322,560 A | 6/1994 | DePue et al. | |
| 5,849,220 A | 12/1998 | Batton et al. | |
| 7,087,569 B2 | 8/2006 | Lentsch et al. | |
| 7,135,448 B2 | 11/2006 | Lentsch et al. | |
| 7,196,045 B2 | 3/2007 | Lentsch et al. | |
| 7,524,803 B2 | 4/2009 | Lentsch et al. | |
| 7,759,299 B2 | 7/2010 | Smith et al. | |
| 7,858,574 B2 | 12/2010 | Smith et al. | |
| 7,968,007 B2 | 6/2011 | Myers et al. | |
| 8,021,493 B2 | 9/2011 | Smith et al. | |
| 2004/0104377 A1* | 6/2004 | Phelps et al. ................... 252/387 |

FOREIGN PATENT DOCUMENTS

JP      02-107789      4/1990

OTHER PUBLICATIONS

Darrin, M.; Chromate Corrosion Inhibitors in Chloride Systems. *Ind. Eng. Chem.* Apr. 1946, vol. 38, No. 4, pp. 368-375.

Cicek, V.; Al-Numan, B.; Chromate Inhibitor Replacements: Current and Potential Applications, *Corrosion Chemistry*; Wiley—Scrivener, 2011; pp. 57-67.

(Continued)

*Primary Examiner* — Monzer R Chorbaji

(74) *Attorney, Agent, or Firm* — Brinks Gilson & Lione; Eric D. Babych

(57) ABSTRACT

Corrosion inhibitors and methods for inhibiting or reducing corrosion are provided. The corrosion inhibitors include one or more niobate containing compounds. The corrosion inhibitors may be added to an aqueous system and inhibit the corrosion of a surface contained in the aqueous system. Illustrative examples of suitable niobate compounds are potassium niobate, ammonium niobate, and ammonium niobate oxalate.

20 Claims, 2 Drawing Sheets

(56) References Cited

OTHER PUBLICATIONS

Stranick, M. A.; The Corrosion Inhibitor of Metals by Molybdate Part I. Mild Steel. National Association of Corrosion Engineers, Jun. 1984, vol. 40, No. 6, pp. 296-302.

Rajendran, S.; Anuradha, K.; Kavipriya, K.; Krishnaveni, A.; Angelin Thangakani, J.; Inhibition of Corrosion of Carbon Steel in Sea Water by Sodium Molybdate—$Zn^{2+}$System. *Eur. Chem. Bull.* 2012, 1(12), pp. 503-510.

Sribharathy, V. G.; Rajendran, S.; Corrosion inhibition of carbon steel by sodium metavanadate. *J. Electrochem. Sci. Eng.* 2(2012), 2, pp. 121-131.

El Etre, A. Y.; Abdallah, M.; Soliman, M. G.; Mabrouk, E. M.; Inhibition of Pitting Corrosion of C-Steel in NaCl Solution by Some Inorganic Compounds. *Commun. Fac. Sci. Univ. Ank. Series* B, V. 46 pp. 25-31 (2000).

Kreysa, G.; Schutze, M.; A 14 Unalloyed steels and low-alloy steels/ cast steel; DECHEMA Corrosion Handbook—Revised and Extended, $2^{nd}$ Edition; DECHEMA: Frankfurt, 2008, Jul. 11, 2013, pp. 1/50-50/50.

Rey, S.; Reggiani, G. M.; Molybdate and Non-Molybdate Options for Closed Systems—Part I and II. *Association of Water Technologies News* [Online], http://www.awt.org (accessed Jan. 3, 2013). Part I pp. 21-30, Part II pp. 17-37.

Graber, T. Molybdenum Local Limit Development. United States Environmental Protection Agency [Online], http://www.epa.gov/region8/water/pretreatment/pdf/Th3_TedGraber_MolybdenumLocalLimitDevelopment.pdf (accessed Feb. 28, 2013) pp. 1-27.

\* cited by examiner

USE OF NIOBATE CONTAINING COMPOUNDS AS CORROSION INHIBITORS

BACKGROUND

1. Field of the Invention

The present disclosure generally relates to corrosion control. More particularly, the disclosure pertains to the use of niobate compounds to reduce or inhibit corrosion of surfaces in aqueous systems.

2. Description of the Related Art

Chromate, molybdate, and other anions with metals in a high oxidation state can be effective as corrosion inhibitors in aqueous systems. However, chromates have essentially been banned from use around the world due to their elevated toxicity levels. Molybdates have generally replaced chromates since they have lower toxicity levels. However, molybdates are much more costly than chromates.

Other oxyanions, such as tungstate and vanadate are also known to be effective corrosion inhibitors but they are even more expensive than molybdate. Nitrites have also been used to control corrosion but in general, when used alone, high doses of nitrites must be applied for an effective treatment. Nitrites can also serve as a source of nutrients for microorganisms in aqueous systems. As such, a more cost effective corrosion inhibitor is needed that does not have the negative issues associated with prior art corrosion inhibitors.

BRIEF SUMMARY

The present disclosure relates to corrosion inhibitors and methods for inhibiting corrosion. In one aspect, a method of inhibiting corrosion of a surface in contact with an aqueous fluid contained in an industrial system is provided. The method comprises adding to the aqueous fluid of the industrial system an effective corrosion inhibiting amount of one or more niobate compounds.

In an additional aspect, a method of inhibiting corrosion of a metallic surface in contact with an aqueous fluid contained in an industrial system is provided. The method comprises adding to the aqueous fluid of the industrial system an effective amount of a corrosion inhibitor consisting essentially of one or more niobate compounds.

In a further aspect, a method of inhibiting corrosion of a metallic surface in contact with an aqueous fluid contained in an industrial system is provided. The method comprises adding to the aqueous fluid of the industrial system an effective amount of a corrosion inhibitor consisting essentially of one or more niobate compounds and one or more nitrite containing compounds.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
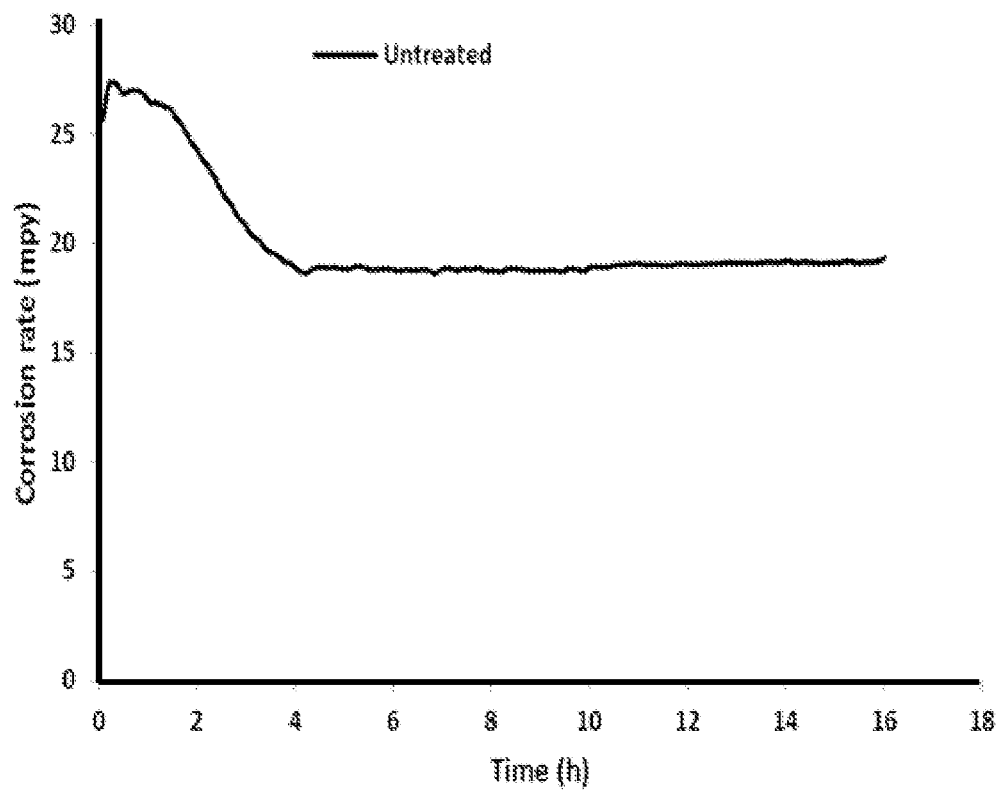
FIG. 1 shows results of a linear polarization resistance measurement with untreated water.

Various embodiments are described below. The relationship and functioning of the various elements of the embodiments may better be understood by reference to the following detailed description. However, embodiments are not limited to those illustrated below. In certain instances, details may have been omitted that are not necessary for an understanding of embodiments disclosed herein, such as conventional assembly techniques.

The present disclosure relates to corrosion inhibitors and various methods for inhibiting corrosion of metallic or glass surfaces. While sections of the present disclosure may refer to a "corrosion inhibitor," it is to be understood, unless specified to the contrary, that a "corrosion inhibitor" may comprise a single corrosion inhibiting compound or may comprise a mixture of two or more corrosion inhibiting compounds. For example, a corrosion inhibitor may comprise potassium niobate and lithium niobate.

In accordance with the present disclosure, the corrosion inhibitor comprises one or more niobate compounds. An example of a niobate compound is a salt of niobic acid. Generally, water soluble niobates of any cation or compounds containing at least one niobate anion may be used in accordance with the present disclosure. As illustrative examples, cations may be selected from lithium, sodium, potassium, rubidium, cesium, zinc, ammonium, quaternary amines, and any combination thereof. Any salt, complex, and/or compound having at least one niobate anion or niobium atom in a higher oxidation state, such as Nb(V), Nb(IV), Nb(III), Nb(II), can be used as a corrosion inhibitor. Thus, in certain aspects, the niobate compounds may comprise potassium niobate, ammonium niobate, and/or ammonium niobate oxalate, for example.

The amount of corrosion inhibitor to be added depends upon the particular application and thus can vary widely. Generally, an amount of the corrosion inhibitor should be added such that corrosion is effectively inhibited or significantly reduced. In certain industrial aqueous systems, the corrosion inhibitor may be added in an effective amount ranging from about 10 ppm to about 10,000 ppm or any sub-range thereof. In some aspects, the corrosion inhibitor may be added in an amount ranging from about 50 ppm to about 1,000 ppm and in other aspects, the corrosion inhibitor may be added in an amount ranging from about 200 ppm to about 800 ppm.

In one particular aspect of the present disclosure, the corrosion inhibitor comprises potassium niobate and from about 150 ppm to about 350 ppm is added to the aqueous system. In another particular aspect, the corrosion inhibitor comprises ammonium niobate oxalate and from about 550 ppm to about 750 ppm is added to the aqueous system.

In certain aspects, the presently disclosed corrosion inhibitor may further comprise a nitrite containing compound. Alternatively, the nitrite containing compound can be added to the aqueous system before the presently disclosed corrosion inhibitor or it may be added to the aqueous system after the presently disclosed corrosion inhibitor. Without wishing to be bound by any theories, it is hypothesized that the nitrite triggers the anticorrosive properties of the niobate compounds. Any nitrite containing compound may be employed, such as sodium nitrite.

The nitrite containing compound, or any mixture of two or more nitrite containing compounds, may be added to the aqueous system in amounts ranging from about 50 ppm to about 10,000 ppm, and any sub-range thereof. In certain aspects, the nitrite is added in an amount ranging from about 200 ppm to about 1000 ppm and in other aspects, the nitrite is added in an amount ranging from about 400 ppm to about 800 ppm.

Therefore, in accordance with one aspect of the present disclosure, the corrosion inhibitor may comprise ammonium niobium oxalate and sodium nitrite and an effective amount of the corrosion inhibitor may be added to the aqueous system such that from about 550 ppm to about 750 ppm of the ammonium niobium oxalate enters the system and from about 400 ppm to about 600 ppm of the nitrite enters the system. In accordance with another aspect of the present disclosure, the corrosion inhibitor may comprise ammonium niobium oxalate and an effective amount of the corrosion inhibitor may be added to the aqueous system such that from about 550 ppm to about 750 ppm of the ammonium niobium oxalate enters the system. Sodium nitrite may be added to the aqueous system before or after the ammonium niobium oxalate in an amount ranging from about 400 ppm to about 600 ppm.

In an additional aspect of the present disclosure, the corrosion inhibitor may comprise potassium niobate and sodium nitrite and an effective amount of the corrosion inhibitor may be added to the aqueous system such that from about 150 ppm to about 350 ppm of the niobate enters the system and from about 400 ppm to about 600 ppm of the nitrite enters the system. In accordance with another aspect of the present disclosure, the corrosion inhibitor may comprise potassium niobate and an effective amount of the corrosion inhibitor may be added to the aqueous system such that from about 150 ppm to about 350 ppm of the niobate enters the system. Sodium nitrite may be added to the aqueous system before or after the niobate compound in an amount ranging from about 400 ppm to about 600 ppm.

The presently disclosed corrosion inhibitors, methods of inhibiting or reducing corrosion, and corrosion control programs can be applied to any type of aqueous industrial system, such as water recirculating systems, cooling water systems, boiler water systems, pulp slurries, papermaking processes, ceramic slurries, mixed solid/liquid systems, and oil-field applications. However, the present corrosion inhibitors can effectively inhibit corrosion in any type of aqueous system comprising a metallic or glass surface. In one aspect, the metallic surface comprises mild steel but in other aspects, the metallic surface may comprise a member selected from the group consisting of mild steel, galvanized steel, aluminum, aluminum alloys, copper, copper nickel alloys, copper zinc alloys, brass, and any combination thereof.

The corrosion inhibitor and any additional chemicals, such as nitrites, scale inhibitors, etc., can be added at any location in the aqueous system. The addition can be manual or it may be automatic, for example, by using chemical injection pumps. The corrosion inhibitor can be added as a solid to the aqueous system and may then dissolve in the recirculating water. Alternatively, the corrosion inhibitor may be added as a solution comprising, for example, the corrosion inhibitor and water, and optionally a nitrite containing compound and/or a scale inhibitor.

In any aspect disclosed herein, the various chemicals, such as niobates, nitrites, and scale inhibitors, can be added independently of each other in any order to the aqueous system, can be added at the same time to the aqueous system, and can be added either manually or automatically to the aqueous system. In some aspects, all chemicals are added automatically in a single solution. In other aspects, the niobate may be added manually and the optional nitrite containing compound and/or scale inhibitor may be added automatically. In additional aspects, all chemicals are automatically added to the aqueous system independently of each other, meaning that each chemical has its own chemical storage tank and chemical injection pump associated therewith. The various pumps can be automatically or manually controlled to inject more or less of the chemical associated therewith into the aqueous system.

Various methods for the reduction or inhibition of corrosion are contemplated by the present disclosure. In one aspect, a method of inhibiting corrosion of a metallic surface in contact with an aqueous fluid contained in an industrial system is disclosed. Again, the method is applicable to any industrial system, such as a closed loop aqueous system, and the metallic surface may comprise any metal, such as mild steel. To carry out the method, an effective corrosion inhibiting amount of one or more niobate compounds is added to the water of the industrial system. Additionally, a nitrite containing compound, such as sodium nitrite, may be added to the water of the industrial system before the niobate, with the niobate, after the niobate, or any combination of the foregoing times of addition.

In certain aspects of the present disclosure, methods are contemplated that incorporate a corrosion inhibitor consisting of or consisting essentially of one or more niobate compounds. If the corrosion inhibitor consists of one or more niobate compounds, it excludes all non-niobate compounds, such as molybdate compounds, vanadate compounds, tungstate compounds, chromate compounds, etc. If the corrosion inhibitor consists essentially of one more niobate compounds, it includes any single niobate compound or combination of niobate compounds and may include other components that do not materially affect the basic and novel properties of the invention. Components considered materially affect the basic and novel properties of the invention may be, for example, molybdate compounds, vanadate compounds, tungstate compounds, and chromate compounds.

In any of the foregoing methods, one or more nitrite containing compounds can be added to the aqueous system at the same time, before, or after the corrosion inhibitor. Thus, in one aspect, an effective amount of a corrosion inhibitor consisting essentially of one or more niobate compounds and one or more nitrite containing compounds may be added to the aqueous system. Again, the addition of the chemical(s) can be manual and/or automatic.

Further, any of the methods disclosed in the present application can be carried out at an operating temperature suitable for the particular system. In some aspects, the methods may be carried out at room temperature. In other aspects, the methods may be carried out from about −30° C. to about 550° C. The operating temperature may vary widely since the methods of inhibiting corrosion disclosed herein may be applied to any type of aqueous system.

Additionally, any of the methods disclosed herein can generally be carried out at the pH of the system where the corrosion inhibitor is being applied. In some aspects, the presently disclosed methods of inhibiting corrosion can occur in an aqueous system having a pH from about 4.0 to about 12.0. In certain aspects, the pH may be between about 7.0 and about 10.0.

In particular aspects of the present disclosure, the corrosion inhibitors may be used in connection with warewashing compositions. Warewashing compositions may be used for protecting articles, such as glassware or silverware, from corrosion in a dishwashing or warewashing machine. However, it is to be understood that the warewashing compositions comprising the presently disclosed corrosion inhibitors can be available for cleaning environments other than inside a dishwashing or warewashing machine.

The corrosion inhibitor may be included in the warewashing composition in an amount sufficient to provide a use solution that exhibits a rate of corrosion and/or etching of glass that is less than the rate of corrosion and/or etching of glass for an otherwise identical use solution, except for the absence of the corrosion inhibitor. In some aspects, the use solution may include at least about 6 ppm of the corrosion inhibitor. In other aspects, the use solution may include between about 6 ppm and about 300 ppm of the corrosion inhibitor. In still further aspects, the use solution may include between about 20 ppm and about 200 ppm of the corrosion inhibitor. In the case of a warewashing composition concentrate that is intended to be diluted to a use solution, it is expected that the corrosion inhibitor may be provided at a concentration of between about 0.5 wt. % and about 25 wt. %, and between about 1 wt. % and about 20 wt. % of the concentrate.

In addition to the corrosion inhibitor, the warewashing composition and/or use solution may also include cleaning agents, alkaline sources, surfactants, chelating/sequestering agents, bleaching agents, detergent builders or fillers, hardening agents or solubility modifiers, defoamers, anti-redeposition agents, threshold agents, aesthetic enhancing agents (i.e., dye, perfume), and the like. Adjuvants and other additive ingredients will vary according to the type of composition being manufactured. It should be understood that these additives are optional and need not be included in the cleaning composition. When they are included, they can be included in an amount that provides for the effectiveness of the particular type of component.

The presently disclosed corrosion inhibitors may be used in connection with any warewashing operation or any warewashing composition, such as those warewashing compositions disclosed in U.S. Pat. No. 7,196,045, U.S. Pat. No. 7,524,803, U.S. Pat. No. 7,135,448, U.S. Pat. No. 7,759,299, U.S. Pat. No. 7,087,569, U.S. Pat. No. 7,858,574, and U.S. Pat. No. 8,021,493, the entire contents of each of these patents being expressly incorporated into the present application.

EXAMPLES

In order to demonstrate that niobate compounds could be effective as corrosion inhibitors, a series of experiments were carried out. Electrochemical measurements (Linear Polarization Resistance—LPR), weight loss balance, and microscopy surface analysis were used as analytical techniques to validate the efficiency of various aspects of the presently disclosed corrosion inhibitor. The metallic surface chosen for the experiments comprised mild steel.

First, trials were carried out using a sample of untreated water as a control to verify the natural corrosion rate of the system, which was found to be about 19.1 mpy, as can be seen in FIG. 1. Cylindrical coupons made of C1018 mild carbon steel were used for the electrochemical and weight loss measurements. Coupon dimensions were: outside diameter—12.0 mm; and length—8.0 mm. The coupons received a surface pretreatment just before use. To start, the coupons were dipped for two minutes in acetone, two minutes in xylene, and then an additional two minutes in acetone in order to remove any residual, oily substances. Then, the coupons were immersed into concentrated hydrochloric acid (36%) for five minutes. Lastly, the coupons were copiously rinsed with distilled water and inserted into the rotating cylinder coupon support.

Electrochemical polarization measurements were performed using an Autolab PGSTAT 302N driven by NOVA 1.8 Software. All trials were carried out at room temperature.

For corrosion inhibition trials, four conventional glass cells ($1000 cm^3$ in volume, assembled in parallel) were used for the polarization studies. A metallic, stainless steel rod was used as a pseudo-reference electrode and a stainless steel rod was used as counter electrode. The rotation rate of the rotating cylinder electrode was 500 rpm. All experiments for corrosion rate measurement, as well for corrosion inhibitor selection, were carried out using linear polarization resistance technique (LPR).

For the weight loss balance experiments, cylindrical coupons received a surface treatment after each electrochemical experiment in order to remove any corrosion product eventually deposited on the surface before being weighted. The electrodes were copiously rinsed with water, smoothly brushed, and then immersed into concentrated hydrochloric acid for 5 seconds. Finally, the electrodes were copiously rinsed with distilled water, dried, and weighed.

$$W = W_1 - W_2 \quad (1)$$

where:
W: total weight loss
$W_1$: pre-test weight
$W_2$: post-test weight

Corrosion rate was obtained according the equation (2):

$$\text{corrosion rate} = \frac{W}{\rho * A * t} \quad (2)$$

where:
$\rho$=density
A=surface area
t=experiment time

Once corrosion rate was known for a specific sample of water, corrosion inhibitor performance could be evaluated. Measurement of weight loss along with instantaneous electrochemical corrosion using LPR was carried out keeping the rotating electrode at 500 rpm. This assay was carried out in the same conditions of the first test, without corrosion inhibitors, but this time in presence of corrosion inhibitors. The pH was adjusted using sodium hydroxide. The percent protection relative to blank samples was determined for each chemical according to the following equation:

$$\text{Efficiency of inhibition}(\%) = ((CR - CR_{CI}) \times 100)/CR \quad (3)$$

where: CR is the corrosion rate without any treatment; and
$CR_{CI}$ is the corrosion rate determined in the presence of corrosion inhibitor.

Diagnosis between localized and general corrosion was accomplished through surface examination before and after each trial.

Figure 2:
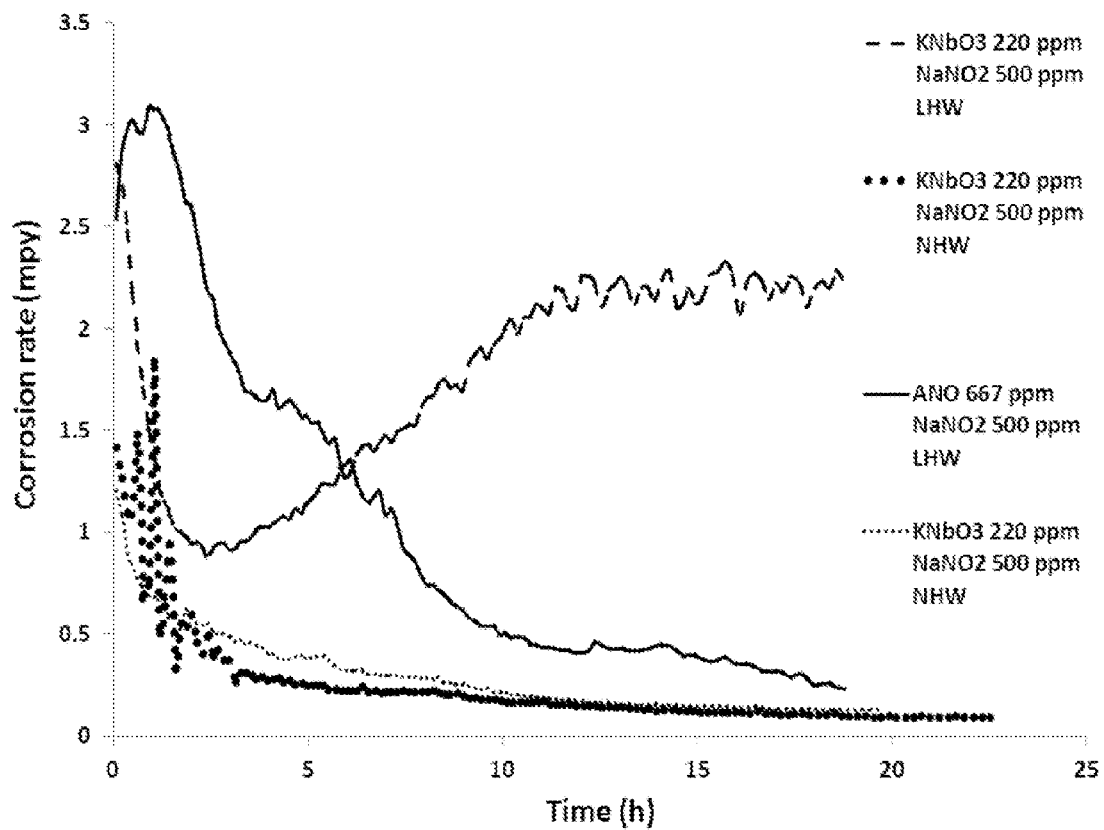
FIG. 2 shows results of linear polarization resistance measurements with water treated with corrosion inhibitors.

The contents of the glass cells and the corrosion rates associated therewith are shown below in Table 1 and also in FIG. 2.

TABLE 1

| Cell | Corrosion Inhibitor | Dosage (ppm) | Nitrite (ppm) | Final pH | Corrosion Rate (mpy) |
|---|---|---|---|---|---|
| 1 | ammonium niobate oxalate | 667 | 500 | 8.93 | 14.7 |
| 2 | potassium niobate | 220 | 500 | 9.05 | 14.5 |
| 3 | potassium niobate | 220 | 500 | 10.64 | 0.5 |
| 4 | potassium niobate | 220 | 500 | 10.28 | 3.3 |

The corrosion rate for cells 1 and 2 were calculated according to weight loss balance after 19 hours of immersion of the coupon. The corrosion rate for cell 3 was calculated according to weight loss balance after 20 hours of immersion of the coupon and the corrosion rate for cell 4 was calculated according to weight loss balance after 24 hours of immersion of the coupon. The data depicted in FIG. 2 was generated using an LPR electrochemical technique (LHW=low hardness water/NHW=no hardness water).

The results obtained, using either LPR or weight loss balance, confirmed the effectiveness of ammonium niobate oxalate and potassium niobate as corrosion inhibitors. Surface analysis of the coupons revealed that potassium niobate effectively eliminates pitting formation. When comparing the corrosion rates from Table 1 with the corrosion rate of the untreated sample (19.1 mpy), it can be seen that the rate of corrosion of the metallic coupon can be reduced by at least about 90%. These results indicate that soluble niobate compounds can be used as effective corrosion inhibitors.

The presently disclosed corrosion inhibitors can reduce or inhibit corrosion in water having low hardness or no hardness at all, with the highest level of corrosion inhibition achieved in no hardness water.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a surface in contact with an aqueous fluid contained in an industrial system comprising:
   adding to the aqueous fluid of the industrial system an effective corrosion inhibiting amount of one or more water soluble niobate compounds.

2. The method of claim 1, wherein the one or more niobate compounds comprise a cation selected from the group consisting of lithium, sodium, potassium, rubidium, cesium, zinc, ammonium, quaternary amines, and any combination thereof.

3. The method of claim 1, wherein the aqueous fluid comprises a temperature of about 10° C. to about 120° C. and a pH from about 4.0 to about 12.0.

4. The method of claim 1, wherein the one or more niobate compounds are selected from the group consisting of potassium niobate, ammonium niobate, and ammonium niobate oxalate.

5. The method of claim 1, wherein the surface comprises a member selected from the group consisting of mild steel, galvanized steel, aluminum, aluminum alloys, copper, copper nickel alloys, copper zinc alloys, glass, and brass.

6. The method of claim 1, wherein the effective corrosion inhibiting amount is from about 6 ppm to about 10,000 ppm.

7. The method of claim 1, wherein the effective corrosion inhibiting amount is from about 200 ppm to about 800 ppm and the one or more niobate compounds are selected from the group consisting of potassium niobate, ammonium niobate oxalate, and any combination thereof.

8. The method of claim 1, further comprising the step of adding to the aqueous fluid of the industrial system an effective amount of a nitrite containing compound.

9. The method of claim 8, wherein the nitrite containing compound is sodium nitrite.

10. The method of claim 8, wherein the effective amount of the nitrite containing compound is from about 50 ppm to about 10,000 ppm.

11. The method of claim 1, wherein a rate of corrosion of the surface is reduced by at least about 90%.

12. The method of claim 1, wherein the one or more niobate compounds are completely water soluble.

13. The method of claim 1, wherein the industrial system is a water recirculating system.

14. A method of inhibiting corrosion of a metallic surface in contact with an aqueous fluid contained in an industrial system comprising:
   adding to the aqueous fluid of the industrial system an effective amount of a corrosion inhibitor consisting essentially of one or more niobate compounds.

15. The method of claim 14, further comprising the step of adding to the aqueous fluid a composition consisting essentially of a nitrite containing compound.

16. The method of claim 14, wherein the effective amount is from about 200 ppm to about 800 ppm and the one or more niobate compounds are selected from the group consisting of potassium niobate, ammonium niobate oxalate, and any combination thereof.

17. A method of inhibiting corrosion of a metallic surface in contact with an aqueous fluid contained in an industrial system comprising:
   adding to the aqueous fluid of the industrial system an effective amount of a corrosion inhibitor consisting of one or more niobate compounds and one or more nitrite containing compounds.

18. The method of claim 17, wherein the effective amount is from about 200 ppm to about 800 ppm and the one or more niobate compounds are selected from the group consisting of potassium niobate, ammonium niobate oxalate, and any combination thereof.

19. The method of claim 17, wherein the one or more nitrite containing compounds comprises sodium nitrite.

20. The method of claim 17, wherein a rate of corrosion of the metallic surface is reduced by at least about 90%.

* * * * *